(12) United States Patent
Kalantar et al.

(10) Patent No.: US 6,934,757 B1
(45) Date of Patent: Aug. 23, 2005

(54) METHOD AND SYSTEM FOR CROSS-DOMAIN SERVICE INVOCATION USING A SINGLE DATA HANDLE ASSOCIATED WITH THE STORED COMMON DATA AND INVOCATION-SPECIFIC DATA

(75) Inventors: Michael Husayn Kalantar, Mohegan Lake, NY (US); Rahul Kumar Merwah, Parlin, NJ (US); John Michael Tracey, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,313

(22) Filed: Jan. 6, 2000

(51) Int. Cl.[7] ................. G06F 15/16; G06F 15/173
(52) U.S. Cl. .................. 709/229; 709/217; 709/219; 709/226
(58) Field of Search ............... 709/200, 201, 709/202, 203, 219, 227, 229, 238, 247, 217, 226

(56) References Cited

U.S. PATENT DOCUMENTS

| | | | | |
|---|---|---|---|---|
| 5,802,590 A | * | 9/1998 | Draves | 709/104 |
| 5,961,593 A | * | 10/1999 | Gabber et al. | 709/219 |
| 6,047,323 A | * | 4/2000 | Krause | 709/201 |
| 6,088,728 A | * | 7/2000 | Bellemore et al. | 709/227 |
| 6,125,384 A | * | 9/2000 | Brandt et al. | 709/203 |
| 6,356,949 B1 | * | 3/2002 | Katsandres et al. | 709/238 |
| 6,360,247 B1 | * | 3/2002 | Fujishiro et al. | 709/203 |
| 6,374,300 B2 | * | 4/2002 | Masters | 709/229 |
| 6,398,105 B2 | * | 6/2002 | Ramberg et al. | |
| 6,446,109 B2 | * | 9/2002 | Gupta | |
| 6,460,071 B1 | * | 10/2002 | Hoffmann | 709/203 |
| 6,629,132 B1 | * | 9/2003 | Ganguly et al. | 709/203 |
| 6,629,150 B1 | * | 9/2003 | Huded | 709/247 |
| 6,629,192 B1 | * | 9/2003 | Schaefer et al. | |

* cited by examiner

Primary Examiner—Rupal Dharia
Assistant Examiner—Quang N. Nguyen
(74) Attorney, Agent, or Firm—Rafael Perez-Pinciro; Anne Vachon Dougherty (57) ABSTRACT

A system and method whereby a client can transfer data to a service on the same or another protection domain and obtain a handle to it, the handle being defined as any mutually agreed-upon token that refers to the data, and which is usually much shorter than the data. The handle may then be passed to a service in lieu of again transferring the data. For example, in the case of a client sending the same data to multiple destinations, the invention allows the data to be transferred from the client protection domain to the service protection domain once using the data transfer operation. The client can then call the communication service any number of times by passing a handle to the instance of the data in the service protection domain, thus obviating the need to repeatedly transfer the data between the client and the service. An alternative embodiment allows the client to aggregate service invocations which are to operate on common data and to transfer a composite service invocation to a service domain using the data handle. The invention can be applied among local entities within one protection domain, between two protection domains at one location, between remote protection domains, across networks, between clients and routers, etc.

19 Claims, 8 Drawing Sheets

METHOD AND SYSTEM FOR CROSS-DOMAIN SERVICE INVOCATION USING A SINGLE DATA HANDLE ASSOCIATED WITH THE STORED COMMON DATA AND INVOCATION-SPECIFIC DATA

FIELD OF THE INVENTION

The invention relates generally to client-service communications and more particularly to the transfer of data and the invocation of operations on that data between a client and a service.

BACKGROUND OF THE INVENTION

A common software construct includes a client in one protection domain invoking a service that is implemented, entirely or partially, in another protection domain. A protection domain is the set of data directly accessible by a given client or service. One common method for implementing a protection domain is to use address spaces, provided by many microprocessors. A common example of cross-domain service invocation is a thread in a user level process calling a service implemented in an operating system kernel. Another example is a thread in one process calling a service implemented in a separate process, possibly on a different machine.

In the case where the client and the service reside in different protection domains, the service may not be able to directly access the data on which the client requires it to operate. Existing methods for cross-domain service invocation, therefore, typically combine the invocation with the transfer of data between the client and service protection domains. The combination of data transfer with the service invocation is inefficient in the case where multiple service invocations are performed with the same or similar data. For example, in many operating systems sending the same data to multiple destinations entails invoking a communication service multiple times. Each time the communication service is invoked, the same data to be sent is copied from the client address space to the kernel address space, resulting in unnecessary utilization of resources.

It is desirable, therefore, and an object of the present invention, to provide a method for calling a service which improves efficiency.

It is another object of the invention to provide a method for calling a service by separating data transfer from operation invocation.

SUMMARY OF THE INVENTION

The foregoing and other objectives are realized by the present invention which includes an operation called data transfer that allows a client to transfer data to another protection domain and to obtain a handle to it. A handle is defined as any mutually agreed-upon token that refers to the data, and which is usually much shorter than the data. The handle may then be passed to a service in lieu of again transferring the data. For example, in the case of a client sending the same data to multiple destinations, the invention allows the data to be transferred from the client protection domain to the service protection domain once using the data transfer operation. The client can then call the communication service any number of times by passing a handle to the instance of the data in the service protection domain, thus obviating the need to repeatedly transfer the data between the client and the service.

BRIEF DESCRIPTION OF THE FIGURES

The invention will now be described in greater detail with specific reference to the appended drawings wherein.

DETAILED DESCRIPTION OF THE INVENTION

Figure 1:
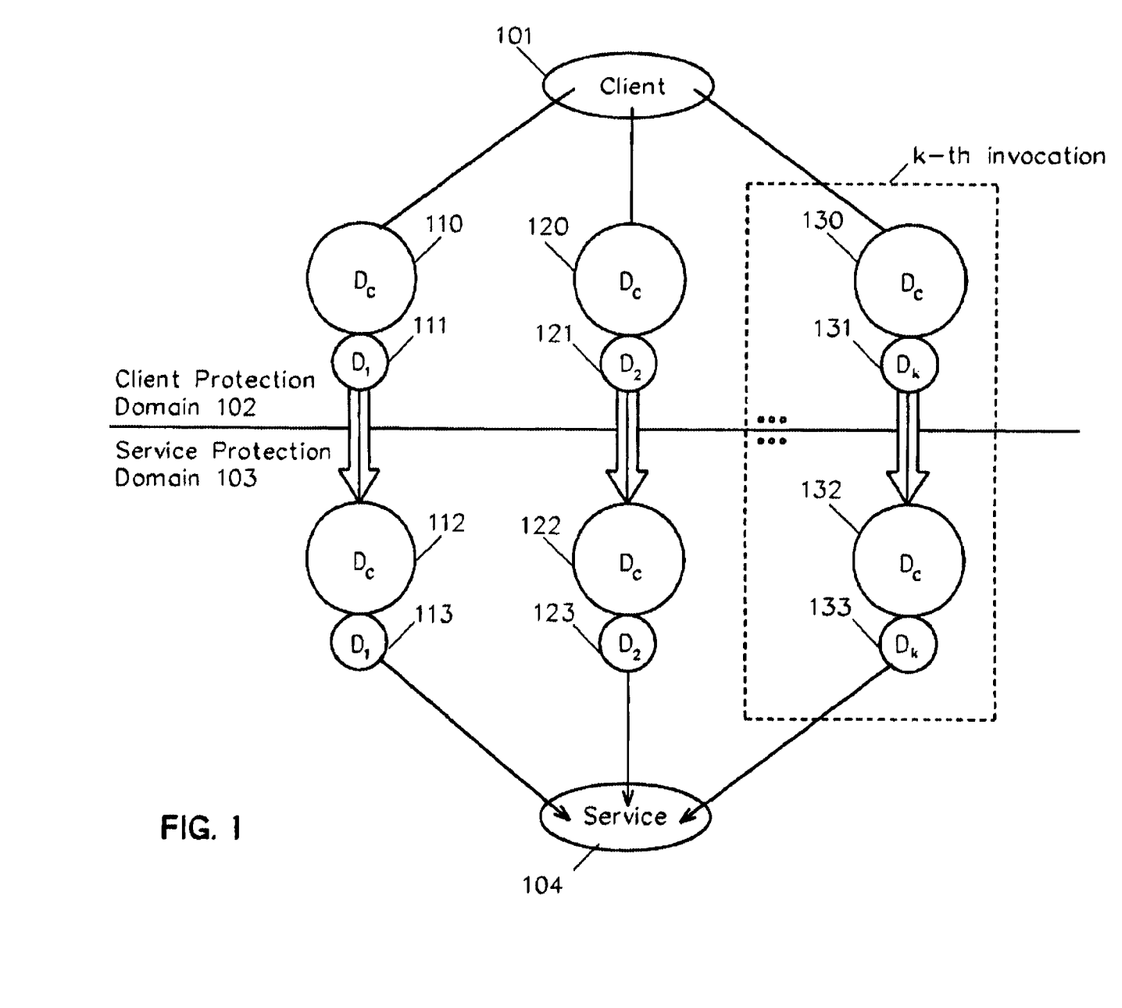
FIG. 1 shows a prior art implementation of a series of service invocations which utilize common data.

FIG. 1 details the current, prior art method for performing an arbitrary sequence of service invocations with the same data. Examples of invoking multiple service invocations with the same data include sending the same data to multiple destinations and encrypting the same data with different keys. For the purpose of this part of the description, the example of a client application (101) sending some common data (e.g., a message) over a network to several distinct destinations using the service provider (104) will be detailed. In addition, while a client and a service protection domain are discussed, it should be understood that the inventive system and method encompass any plurality of client and service entities, regardless of their hierarchical relationship, whether on the same or different protection domains.

Conventionally, to perform k service invocations, or operations, on a common piece of data $D_c$, k transfer-and-service invocations are performed. Each invocation entails a transfer of the common data, $D_c$ shown at 110, 120 and 130, and any invocation-specific data, $D_t \ldots D_k$ shown at 111, 121 and 131, between the client protection domain 102 and the service protection domain 103. In FIG. 1, the first invocation will cause the common data from 110 and the invocation specific data from 111 to be transferred from the client protection domain to the kernel protection domain, 112, 113, respectively. Similarly, when the service is invoked again, the common and the invocation-specific data, from 120 and 121, are transferred as part of the service invocation from the client domain and stored in 122, 123 in the service domain for a second invocation, and so on, as depicted for the k-th invocation during which the common and invocation specific data 130 and 131 are transferred from the client to the service domain, at 132 and 133. The invocation-specific data is any additional information that may be used by the service. In the example scenario, the invocation-specific data might include the address of the destination to which the common data message is being sent. In many cases, the size of the common data is very much larger than the size of the invocation-specific data.

Figure 2:
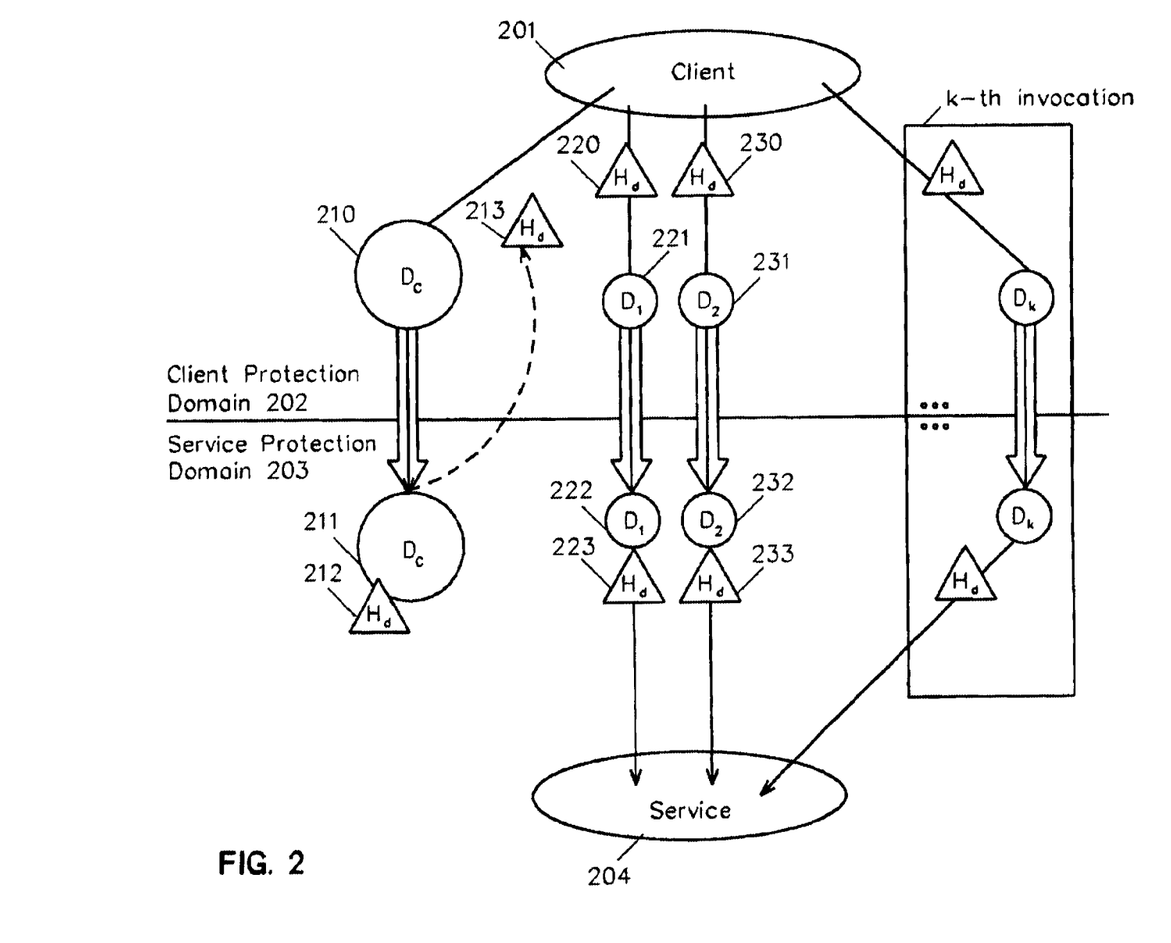
FIG. 2 provides a schematic representation of a first embodiment of the present invention.

FIG. 2 details a representation of a basic implementation of the present invention. There are two main facets to the invention, namely the data transfer and the service invocation request aspects. Under one embodiment of the present invention, a system component at the client device 201 of the client protection domain identifies data to be transferred and assigns a handle to that data prior to transferring same in a data transfer step to the service protection domain. Thereafter, whenever the data is needed at the service protection domain, the client need only send the handle for that data during a service invocation step. Alternatively, as part of the data transfer step, a component at the service 204 of the service protection domain may create the data handle, associate it with data which has been or is to be transferred from the client to the service, and provide the data handle to the client protection domain for future use. Handle assignment is further discussed below with reference to FIG. 6.

The data transfer step is the step in which common data, $D_c$, shown at 210, is transferred from the client protection domain 202 to the service protection domain 203. A handle, $H_d$, shown in the client domain at 213, can be used to identify the service protection domain's copy of the data. A copy of the handle, shown at 212 of the service protection domain, is associated with the service protection domain's copy of the data $D_c$, shown at 211. As noted above, the specifics of the generation of the handle are not a part of the inventive method. For example, the handle could be generated by the service and returned to the client. Alternatively, the handle could be generated by the client and sent as part of the data transfer request. As yet another alternative, a third party can generate a handle, or a handle-pair, and send it to both protection domains, before or after data transfer. In still another alternative, the handle could be implicit, for example, by using a counter started at the same point in both domains. A handle remains valid until it is canceled. The cancellation of a handle can either be explicit, as when the client requests its cancellation, or implicit, as in the case of expiration by a timeout or cessation of the relevant process.

Data can be transferred through a variety of mechanisms. For example, if both the client and service are in separate protection domains on the same machine, data transfer might be achieved by copying or by remapping to the service protection domain. If the client and service are on different machines connected by a network, data transfer might be achieved by sending the data across the network. The data transfer may also include a transformation of the data from one representation to another. For example, in many UNIX* operating systems, the transfer of data to a communication provider will require the transformation of the data from a buffer to a mbuf chain.

The service invocation request step is the step in which the client requests a cross-domain service invocation that may include one or more data handles $H_d$, shown at 220, and any invocation-specific data $D_i$, shown at 221, necessary to perform the requested service. The data handle $H_d$ and the invocation-specific data $D_i$ are transferred to the service protection domain into buffers 222 and 223, respectively. At any time after the service is requested, the service provider will execute the requested service using the data that is referred to by $H_d$, shown at 223 as stored at the service location, using any invocation-specific data $D_i$, shown at 222, that was passed in the service invocation request.

It is to be noted that the common data need not be transferred in its entirety in a single step. The method also does not dictate how the data is separated into common data and invocation-specific data; such that, for the example comprising a message and a plurality of addresses for message destinations, one way of separating the two categories of data would be to characterize the message as the common data and the destinations as the invocation-specific data, while a second way of separating the data would be to treat the list of destinations as common data and the message content (e.g., an update of stored data) as the invocation-specific data.

Further, it is to be noted that the order in which the data transfer and service invocation request steps are performed is not critical, although usually the service cannot be performed until the data is available to it. For the example case under consideration, where the common data comprises the message and the service invocation data comprises a plurality of destinations, for that message, the data transfer step will be invoked exactly once and the network send service invocation request step will be invoked k times. As depicted in FIG. 2, the second time the client wants to invoke the service (i.e., to send the message to a second destination), it invokes the service invocation request with its copy of the handle, shown at 230, and its invocation-specific data, shown at 231, which are transferred into 232 and 233, respectively, as part of the transfer and which are then used by the service. The foregoing method represents a saving over conventional methods because the common data is transferred only once.

Figure 3:
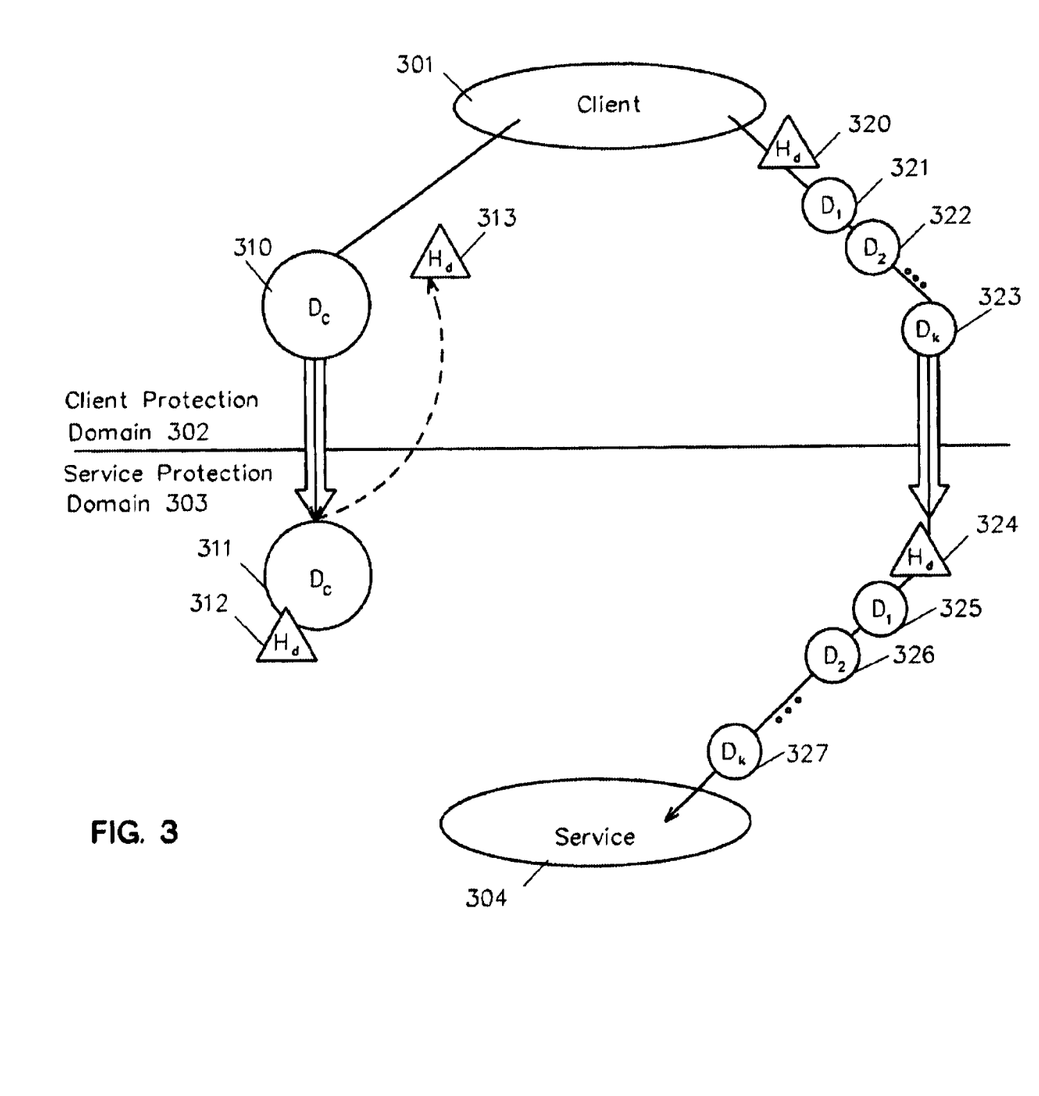
FIG. 3 provides a schematic representation of a second embodiment of the invention utilizing a composite service invocation request step.

An alternative implementation of the present invention is depicted in FIG. 3. Instead of invoking k cross-domain service invocations on common data which has already been transferred, an alternate step is conducted wherein a composite service invocation request is performed. In a composite service invocation request step, the client passes all the invocation-specific data, $D_1 \ldots D_k$, shown at 321, 322, 323, that may be necessary to perform the k cross-domain service invocations (where k>=1) on the same common data represented by handle $H_d$, in one invocation. The data transfer method in this extension is exactly the same as that described in the basic invention (where data at 310 are transferred to 311), with the handle $H_d$ being associated to the data by each location (see: 312 and 313), but the service invocation request is redefined to be a composite service invocation request.

The composite service invocation request step is one in which the client, 301, requests a cross-domain service invocation that may include one or more data handles $H_d$, shown at 320, and any invocation-specific data, $D_1 \ldots D_k$ shown at 321, 322 and 323, that is necessary to perform k service invocations, where k>=1. The handle and the invocation-specific data are transferred from the client protection domain 302 into the service protection domain 303 to buffers 324, 325, 326, and 327. At any time after the composite service invocation is requested, the service provider 304 executes the requested services using the data (referred to by $H_d$) and the portion of the invocation-specific data ($D_1 \ldots D_k$) that is relevant to that service invocation request. The k service invocations which comprises a composite service invocation need not invoke the same service.

The implementation shown in FIG. 3 further reduces the overall cost of performing multiple cross-domain service invocations because common data is transferred only once and multiple cross-domain service invocations are bundled into one composite cross-domain invocation, thereby reducing the overhead associated with performing cross-domain invocations.

It is envisioned that the data transfer step and the service invocation step could be combined in an initial data transfer from the client to the service. In such a combined step, the common data would still be retained by the service with an associated handle so that subsequent service invocations could be performed simply by using the handle.

A software kernel embodiment of the invention will now be detailed with specific reference to FIGS. 4–8. In the scenario where a client application is implemented on a machine running a UNIX operating system, the client executes in its own protection domain, enforced by separate address spaces. To send data over a network, the client interacts with the operating system kernel, or kernel for short. In this embodiment, the client application sends the same data to multiple destinations via TCP.

Figure 5:
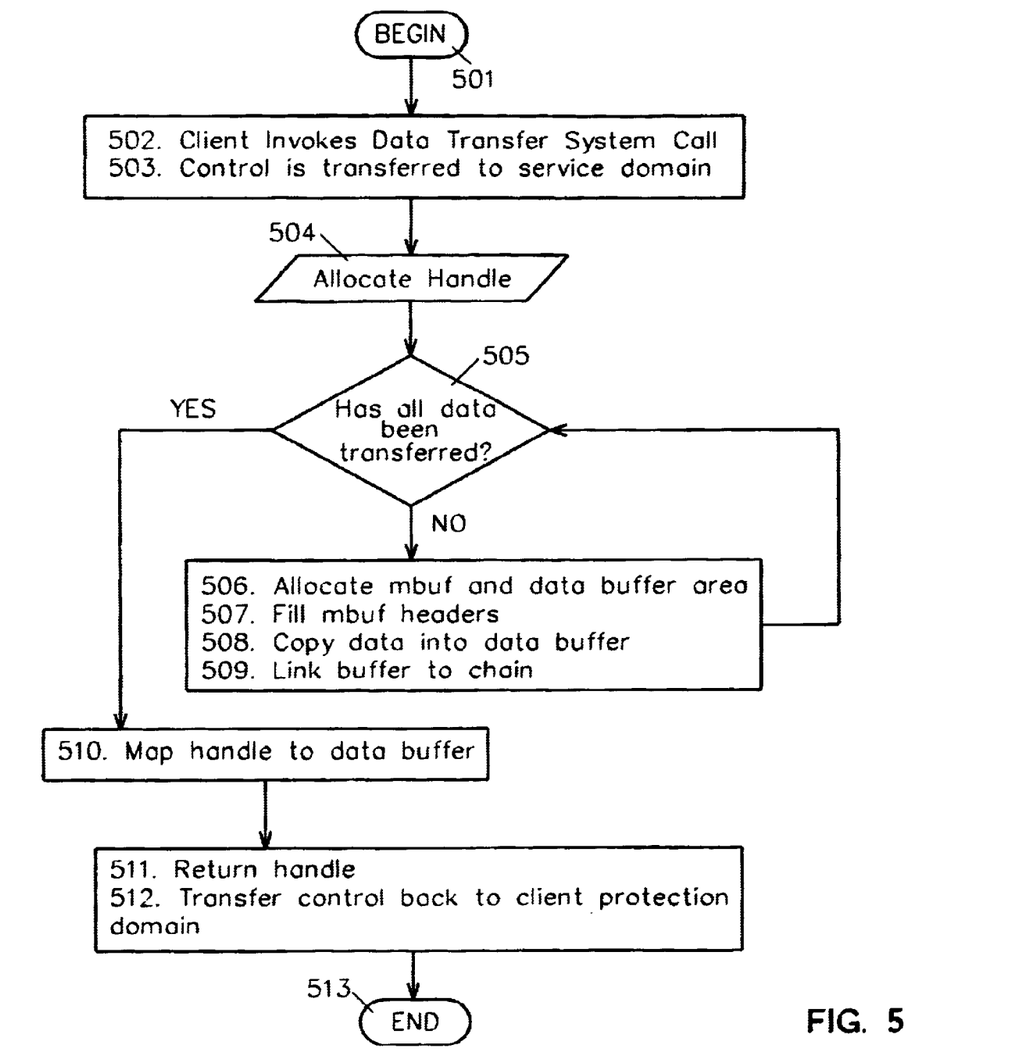
FIG. 5 details the process flow for data transfer in accordance with one implementation of the present invention.

In order to send the same data to multiple destinations, the client application which resides in the client protection domain begins at 501 and invokes the data transfer system call at step 502, as shown in FIG. 5. The invocation of the data transfer system call will transfer control, as depicted at 503, to the kernel which is in the service protection domain. For this particular embodiment, the data transfer system call attempts to allocate a handle at 504 by requesting one from a handle allocation component (not shown) as further discussed with reference to FIG. 6. Once all data has been transferred, as determined at step 505, the handle must be mapped to the service location's data buffer at which the data is stored, as shown in step 510.

Figure 4:
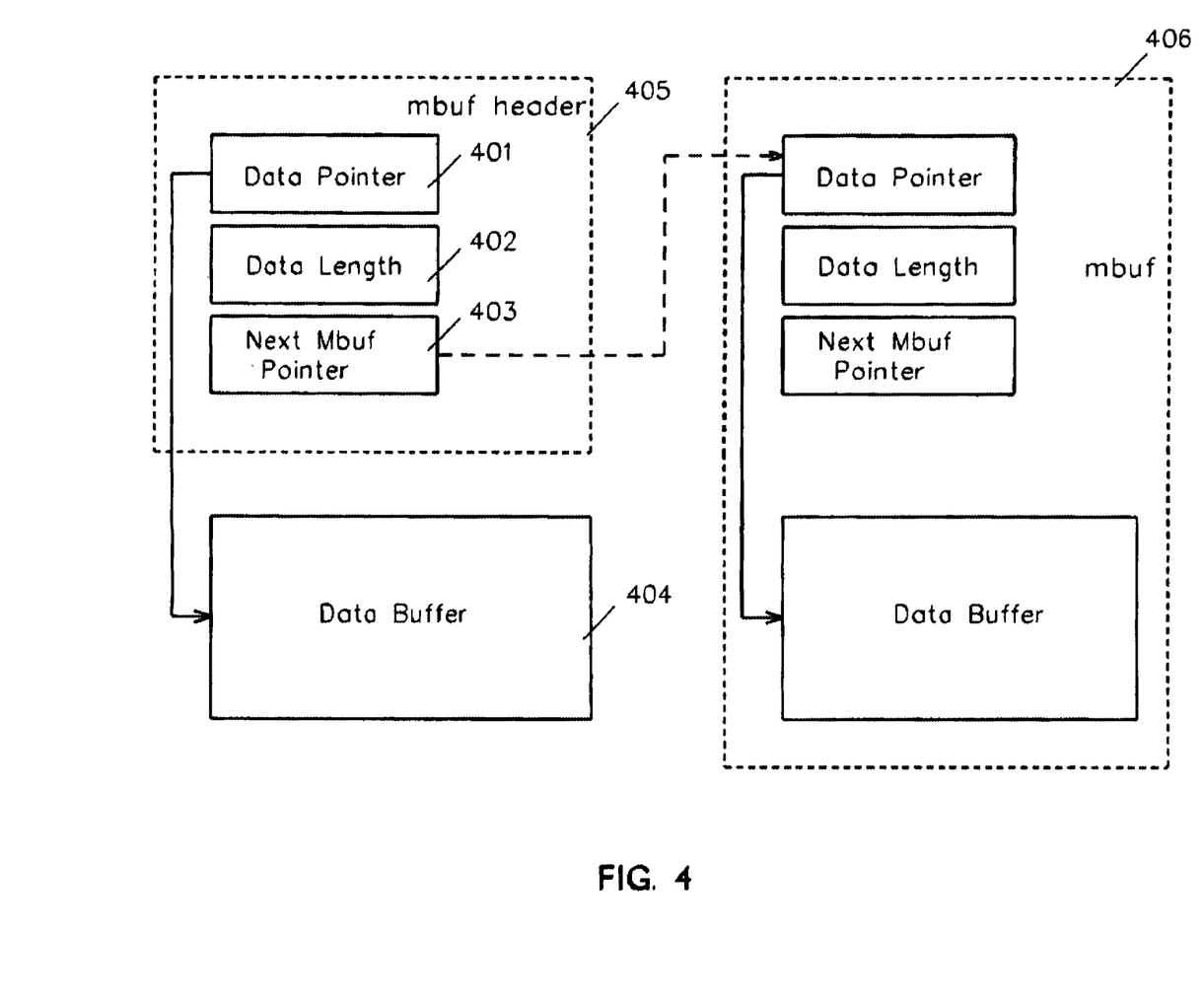
FIG. 4 shows a simplified mbuf chain for use with the present invention.

In a kernel, data is stored in an mbuf structure which supports certain fixed sizes of data. As depicted in FIG. –4, an mbuf chain is a data structure with a header 405 that has a pointer to the data 401, its length 402, and a pointer 403 to any following mbufs 406 that are part of the chain. Since the total data to be transferred may be greater than the size that can be stored in a single mbuf, it may be broken up into chunks and stored in several mbufs. For every chunk of data, a data buffer 404 is allocated for it, as depicted in step 506 of FIG. 5. The mbuf header 405 is filled in with appropriate values at step 507 and the portion of the user data is copied to the allocated data buffer at step 508. The mbuf header is then linked into an mbuf chain at step 509. An mbuf chain is a linked list of mbuf headers. Note that for a small amount of data, less than the amount that fits into a single data buffer, this mbuf chain will contain only one element.

After the data has been copied into an mbuf chain, an entry for the allocated handle is updated at 510 to refer to the address of the first mbuf in the mbuf chain. Finally, the system call returns the handle to the client application at 511 and transfers control back to it at 512. If any errors are encountered along this process (for example, a handle could not be allocated or not enough buffers remain), the system call undoes its actions and returns a message, such as an INVALIDHANDLE message, to the client application along with the appropriate error code and error message. The process ends, or exits, at 513.

Figure 6:
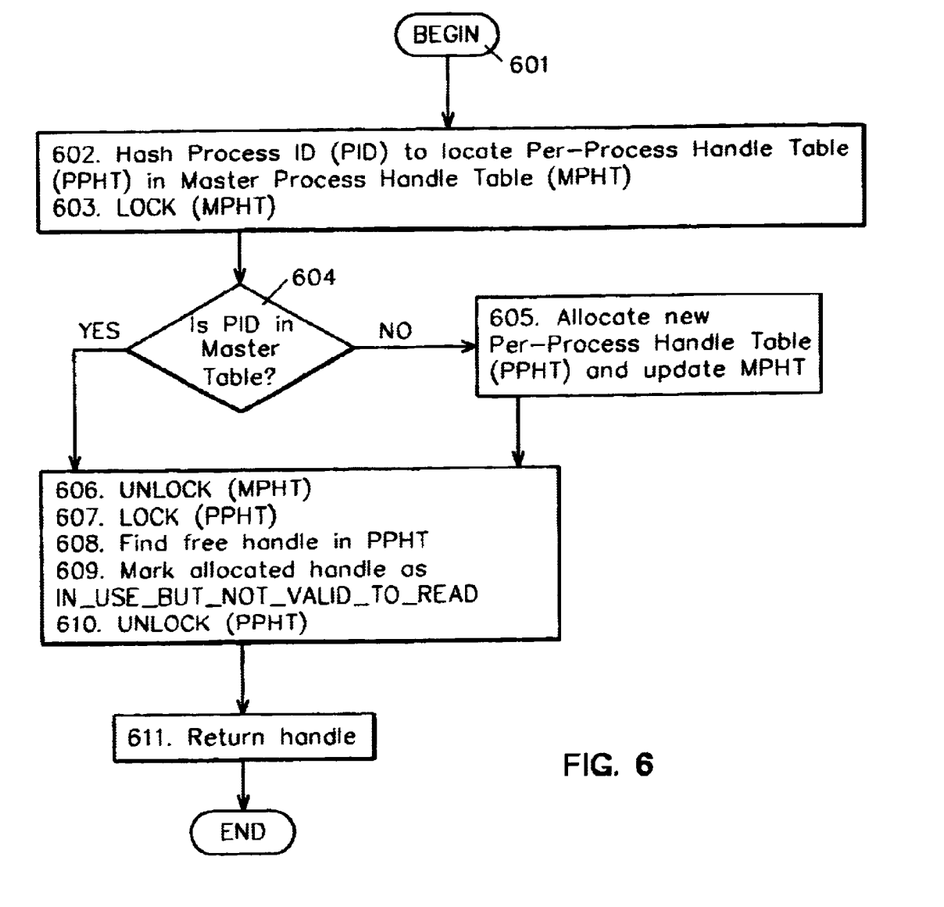
FIG. 6 depicts the handle allocation process flow for one implementation of the present invention.

FIG. 6 depicts the handle allocation process flow for one implementation of the invention. Upon beginning, at 601, the handle allocation component, which comprises a functionality which is optimally provided as part of the operating system, hashes the process id of the client application to look up the per-process handle table (PPHT) in the Master Process Handle Table (MPHT), as shown in step 602. If the MPHT does not contain a valid entry for the process, as determined in step 604, a new PPHT is allocated and a reference to it is stored in the MPHT at 605. The PPHT is searched for the first available handle, in step 608, the state of the handle is marked as IN_USE_BUT_NOT_VALID_TO_READ, or other equivalent value, in step 609, and is returned to the caller at 611. This means that the handle has been allocated but does not, as yet, refer to a valid buffer. All accesses to the MPHT and the PPHT have to be synchronized and, therefore, have to be locked by using a semaphore or other locking mechanism, as shown in steps 603, 606, 607 and 610. Once the data has been transferred and the handle has been associated to it (at 510), the state of the handle is updated, to IN_USE_VALID_TO_READ, or another equivalent value.

Figure 7:
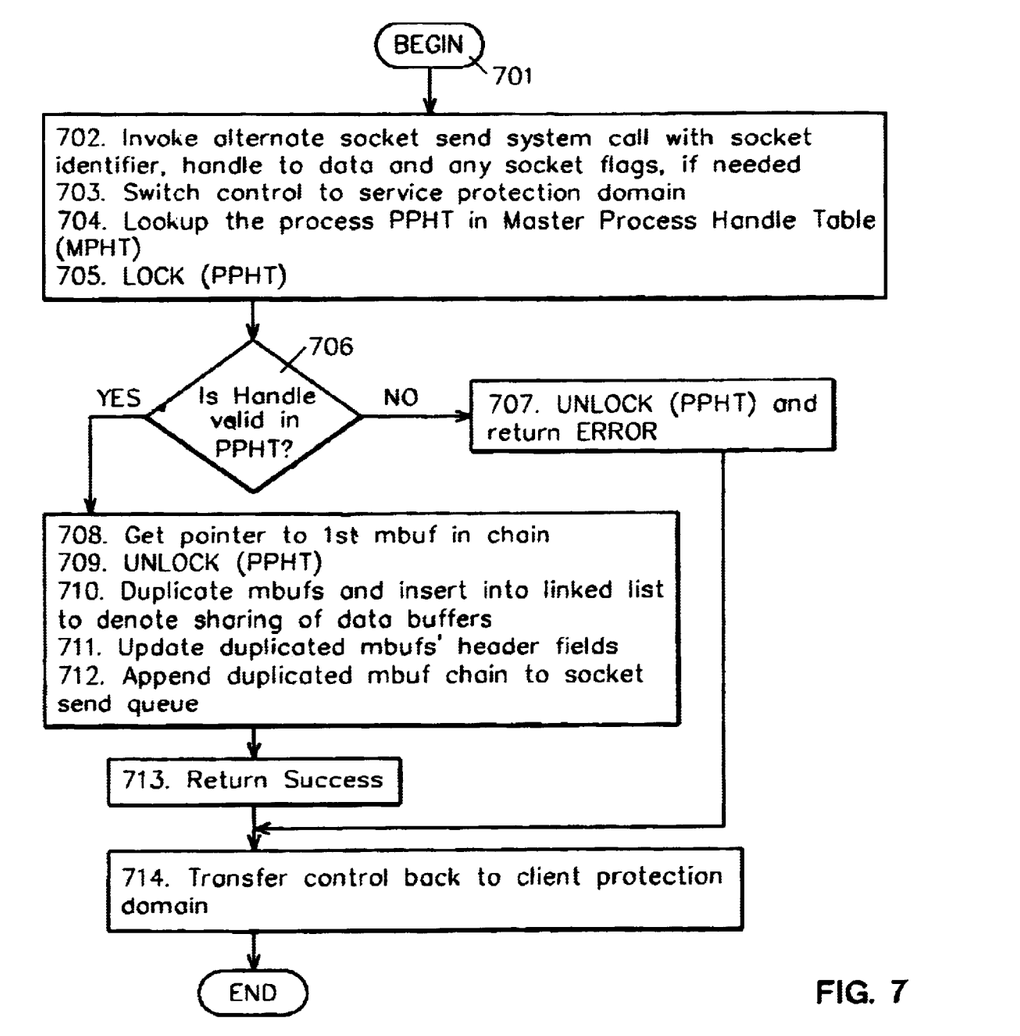
FIG. 7 details the process flow for a kernel embodiment of the inventive invocation process.

After the data transfer and the handle allocation have been completed, in the basic invention scenario, the client application in the client protection domain then requests that the common data be sent to a destination using an alternate socket send system call, which is detailed with reference to FIG. 7. Upon beginning at 701, the alternate socket send system call takes at 702, as arguments, the handle of the data, the socket identifying the destination, and any flags, as in a typical socket send call. At this point control is transferred at 703, to the service in the service protection domain. The alternate socket send system call uses the PPHT and MPHT, or equivalents, to look up the data referenced by the handle that it was passed and to get a pointer to the kernel mbuf chain. To do this, the PPHT is found, as in the data transfer system call, in step 704. The handle is used as an index into the PPHT and, if the address in that entry points to a valid memory location, as determined at 706, that address is returned at step 708. If the address does not point to a valid memory location, the PPHT is unlocked and an INVALIDHANDLE error value is returned at step 707. As always, access to the MPHT and PPHT are synchronized, as shown in steps 705 and 709.

For each mbuf in the chain, the mbuf header is duplicated and an implicit reference counter is created by inserting the duplicated mbuf into a linked list of all mbufs that share a common data buffer, at step 710. The new chain of mbuf headers is needed because each socket stores its protocol headers (TCP, IP, etc) in the mbuf header. Headers of the duplicated mbuf are updated at 711. This new mbuf header chain can then be inserted directly into the socket output buffer (so_snd) at 712, thereby avoiding copying any of the original user data. When the socket is done with a packet, the mbufs are freed which implicitly reduces the reference counter to the data buffer. When an mbuf is freed and its linked list only has a pointer to itself, then it is the last user of the data and the data buffer can be safely reclaimed. As long as the client application does not destroy its handle, the mbuf data buffer will have a non-zero reference count.

The client application repeatedly calls this alternate socket send system call, once for each destination to which it wishes to send the data. If there is any error, for example, in looking up the handle or in sending the data on the socket, an appropriate error code is returned to the client application as a return value of the service invocation system call, at 713. Control is returned to the client application at 714.

Figure 8:
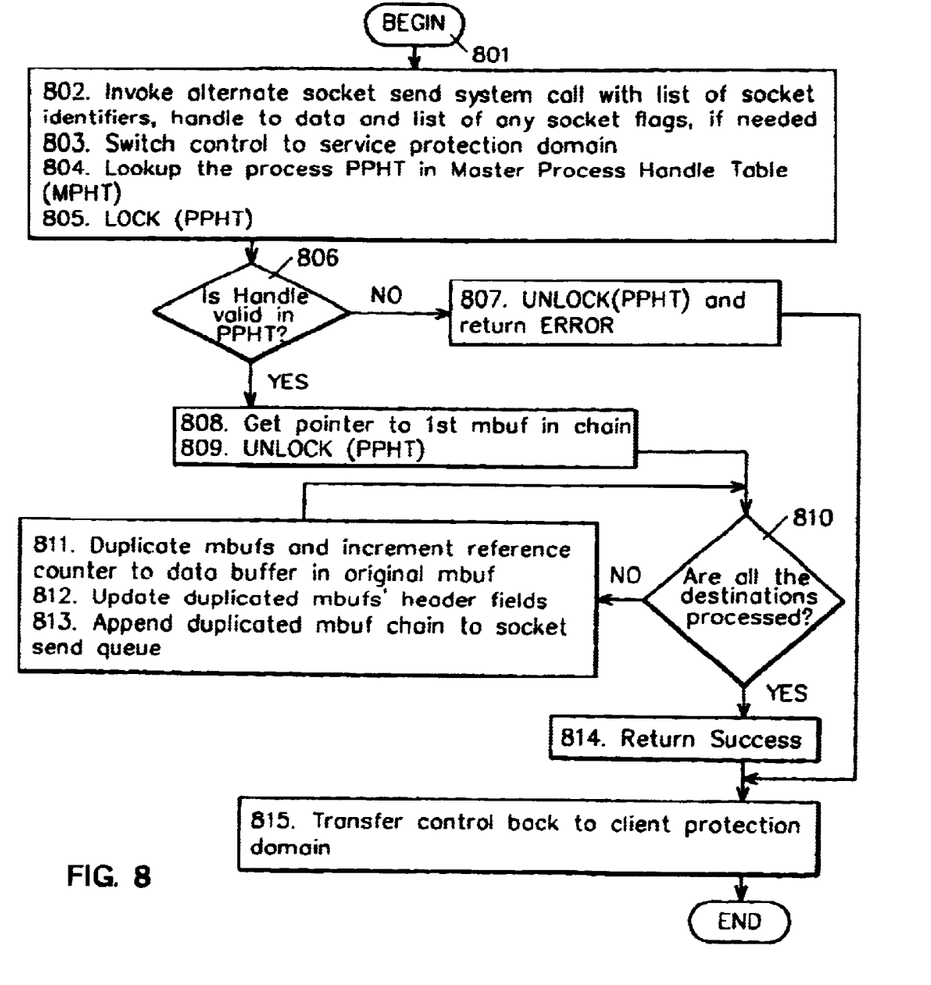
FIG. 8 provides a process flow for an alternative embodiment of the inventive invocation process.

In the extension scenario wherein a composite invocation is utilized, as shown in FIG. 8, upon beginning at 801, the client invokes a modified alternate socket send system call that takes, as arguments, a handle to the data, a list of socket identifiers, one for each destination, and an out-parameter comprising a list of error codes, one for each destination, as shown at 802. As above, the modified alternate socket send system call de-references the handle to obtain a pointer to the mbuf chain, as depicted in steps 803, 804, 805, 806, 807, 808 and 809; and, for each destination in the list of socket identifiers, sends the data at 810, as described in the basic invention scenario, see 811, 812 and 813 which parallel steps 711, 712 and 713 described above. This method has the additional advantage that, if the client knows in advance the list of destinations to which it wants to send the data, it can group the send calls into a single system call, saving the overhead of additional system calls. Since it is possible for a send to fail on each of the sockets independent of the others, the out-parameter of the modified alternate socket send system call is used to report an error code for each destination, at 814. Control is transferred to client application at 815.

In either the basic scenario or the extension scenario, when the client no longer wishes to send the same data to a new destination, the client uses a free data system call to indicate that the data structures that contain the data can be freed. This system call takes a handle as an argument. It frees the mbuf chain containing the data when it is able to do so, and removes references to the data (e.g., from the PPHT). This freeing may not happen immediately, because the network send service may still be holding a reference for a packet on a socket which may not yet have been acknowledged. The mbuf can be reclaimed as soon as its reference count drops to 0. The meaning of the handle is effectively destroyed when the free data system call returns. Thereafter, the client application can no longer use this handle to refer to the data. If it attempts to do so, an error occurs.

A person skilled in the art will be able to apply the patent to other scenarios in both software and hardware without departing from the spirit and scope of the invention. Several extensions which may be implemented include those discussed below.

In a microkernel embodiment, services are designed over a microkernel. A process in one protection domain, for example a user application process, may need to use the services of another process, an act that involves transferring some common data multiple times. For example, in microkernel systems, the service that sends messages over a network may be a user level process. The client application can transfer the data to the communication service and then send data to multiple destinations by invoking one or more sends.

The invention can also be applied to networking environments. In a network transportation service embodiment, for example, a router may be viewed as offering a data forwarding service. This is different from the kernel example because the protection domains are on separate machines. A client is a machine that wants to invoke the router service to send the same data to several destination machines. Rather than the originating machine generating one copy of the data for each destination and asking the router to simply forward the data packets, the client machine can generate just one copy of the data and transfer it to the router in exchange for a handle to the data. The client machine then uses that handle in a service invocation to the router requesting it to send the data to a list of destination machines. The router will regenerate the packets as necessary, for example, for the machines that are directly connected to it. Further, the router may take the role of client, repeating the same approach with other routers implementing the data forwarding service.

Another network embodiment is a remote service invocation embodiment wherein the protection domains are separate processes on separate machines. When several services are to be invoked on the same data at one remote destination site, it makes sense to aggregate the common data across the service invocations to be performed, to transfer it once, and to get a handle to the data. This handle can then be used as a reference in the service calls that are invoked on the remote machine.

This invention is not tied to network services. An embodiment that performs a different service is an encryption embodiment. If the client application wants to encrypt some common data using different public keys, it first transfers the data into the encryption service's protection domain and obtains a handle. Invocations of the encryption service use the handle to refer to the data. In this embodiment, the service is encryption, the client protection domain is the client application's address space and the service protection domain is the address space of the encryption service.

This invention is described on a UNIX operating system but the principles can be applied to any operating system. Also, terminologies and data structures related to UNIX, like mbufs and mbuf chains, are used; but, the method can easily be implemented in other operating systems using alternate data structures. For example, it can be implemented in Windows systems which use data structures called memory descriptor lists (MDLs).

A separate Handle Management Subsystem (HMS) is not a necessary component of the inventive system; however, each of the functions of a Handle Management Subsystem, including handle allocation, associating handles to data, and translation of handles for locating the data, is required to be performed by at least one of the client and the service. Service implementations in a common protection domain can manage their own buffers and handles, should they choose to do so. Delegating to one HMS in a protection domain, however, is preferable, since it allows the management to be done in one place and leverages existing facilities in a protection domain, rather than having the same work being redone by each service provider in that protection domain.

As noted above, it is not necessary that the service create the handle. Handles could be created by the client, by a third party, or implicitly. The only restriction is that handles uniquely identify data. This uniqueness can be restricted to a single protection domain, or can extend beyond a single client-service provider pair allowing clients to share handles.

Handles can be destroyed and the storage space that they refer to can be reclaimed. Handles can be destroyed by a separate data free call; however, in an optimized implementation, handle destruction may be combined with other cross-domain requests including other data transfer calls, other service invocation calls that may not use the handle explicitly, or service calls that use the handle and then destroy it. Other possible strategies to reclaim handles include handles with timeouts or implicit definitions of handles that they will expire after a certain number of predetermined uses. In all cases, the semantics of a handle destroy process remain equivalent to the free data system call as described in the detailed embodiment section.

It is not imperative that all of the data be transferred to the service provider's protection domain before the services are invoked. Asynchronous services can be invoked with a "future" handle. The requested services would then be completed when the data referred to by the handle is transferred to the service provider's protection domain.

All the data need not necessarily be transferred in one pass. There may be physical buffering constraints or adoption of policies by the system to implement quotas that prevent one client from using up all the buffers in the system.

It is not a necessary aspect of the invention that the service request accept a single handle; nor is it important for a single data transfer call to return exactly one handle per data transfer call. For example, several handles can be passed in a service invocation if the data has been transferred via several data transfers. A data transfer system call implementation may choose to accept an array of data buffers to be stored in the service's protection domain and to return a handle for each element in the array, or a single handle referring to all of the data.

It is not necessary for the data transfer to consist of physically copying the data from one protection domain to another. Other possible methods for transferring data include remapping virtual pages or sending the data over a network.

In addition, services need not be synchronous. They may instead be asynchronous. The status of the calls can be returned later via a mechanism such as completion routines or interrupts.

The method may be applied repeatedly as demonstrated by the network embodiment. It may also be applied to a derived service composed of other "basic" services. For example, a client that wants to encrypt some common data with the public keys of several destinations and then send the data to those destinations. In this example, the client would first transfer the data to the kernel. The kernel copy would be used by both the encryption service and the network send service to perform the sequence of tasks specified by the client.

While the invention has been described with specific reference to several preferred embodiments, it will be clear to one having skill in the art that the system and method can be modified and alternatively applied without departing from the spirit and scope of the invention as set forth in the appended claims.

What is claimed is:

1. A method for providing common data from a first source entity to a second entity, wherein said second entity is to perform processing on the common data at the request of said first source entity by more than one of a plurality of different service applications at said second entity using invocation-specific data, comprising the steps of:

transferring the common data from the first source entity to be stored at the second entity for subsequent processing on said common data by more than one of said plurality of different service applications;

storing the common data as stored data at said second entity;

associating a single data handle to the stored data, wherein said first and said second entity each are aware of the handle; and invoking service on said common data by said first source entity generating a request comprising said data handle and invocation-specific data to invoke processing on the common data by said plurality of different service applications at said server.

2. The method of claim 1 further comprising storing the data handle with the stored data.

3. The method of claim 1 wherein said transferring and said invoking are done simultaneously and wherein said method further comprises invoking at least one successive service on said common data by using said data handle after said storing and associating steps.

4. The method of claim 1 wherein said first entity requests a plurality of services be invoked on said common data by transferring a composite service invocation to said second entity.

5. The method of claim 1 wherein said associating of the handle is conducted at the first entity and wherein the handle is transferred to the second entity.

6. The method of claim 1 wherein the associating of the handle is conducted at the second entity and wherein the handle is overtly communicated from the second to the first entity.

7. The method of claim 1 wherein said associating of the handle is performed by a third entity and communicated to said first and said second entity.

8. The method of claim 1 wherein said associating of a handle is performed implicitly by the transfer of said common data.

9. The method of claim 1 further comprising transforming said common data from a first representation to a second representation.

10. The method of claim 1 wherein said at least one service comprises file I/O by the second entity.

11. The method of claim 1 wherein the second entity comprises a kernel and wherein the service is provided by the second entity.

12. The method of claim 3 wherein said at least one service comprises data transfer across a network.

13. The method of claim 3 wherein said at least one service comprises encryption of said common data.

14. A system for providing data handling comprising:

a first source entity having first common data, said first source entity including a transmitting component for transmitting at least said first common data to a second entity and for requesting storage of said common data as stored data and an invocation component for generating at least one service invocation request comprising a data handle identifying said stored data and service invocation-specific data and for transferring said at least one service invocation request to said second entity to invoke operations on said common data by different service applications at said server;

a second entity for storing said common data transmitted from said first source entity as stored data, for receiving said at least one service invocation request, for locating common data on which to perform at least one service based on said data handle, and for performing at least one service on said common data by at least one of a plurality of different service applications at said second entity processing said common data; and at least one data handle component for associating a single data handle to the stored data and for communicating said handle to said first and said second entity.

15. The system of claim 14 wherein said invocation component generates a composite service invocation request comprising said data handle and service invocation information for a plurality of services to be performed using said common data.

16. The system of claim 14 wherein said at least one data handle component comprises a component of said first entity.

17. The system of claim 14 wherein said at least one data handle component comprises a component of said second entity.

18. The system of claim 14 wherein said first entity is located in a separate protection domain from said second entity.

19. A program storage device readable by machine, tangibly embodying a program of instructions executable by the machine to perform method steps for providing common data from a first source entity to a second entity, wherein said second entity is to perform processing by more than one of a plurality of different service applications at said second entity on the common data at the request of said first source entity using invocation-specific data, comprising the steps of:

transferring the common data from the first source entity to be stored at the second entity for subsequent processing on said common data by more than one of said plurality of different service applications;

storing the common data as stored data at said second entity;

associating a single data handle to the stored data, wherein said first and said second entity each are aware of the handle; and invoking service on said common data by said first source entity generating a request comprising said data handle and invocation-specific data to invoke processing on the common data by said plurality of different service applications at said server.

* * * * *